May 13, 1969      H. S. WHITE      3,443,651

ENERGY SENSING WEIGHER FOR PACKAGING MACHINERY

Filed Aug. 17, 1966      Sheet 1 of 3

INVENTOR,
HOMER S. WHITE

BY Watson, Cole, Grindle & Watson
ATTORNEYS

INVENTOR,
HOMER S. WHITE

United States Patent Office 3,443,651
Patented May 13, 1969

3,443,651
ENERGY SENSING WEIGHER FOR
PACKAGING MACHINERY
Homer S. White, Atlanta, Ga., assignor to The Woodman
Company, Inc., Decatur, Ga., a corporation of Georgia
Filed Aug. 17, 1966, Ser. No. 573,063
Int. Cl. G01g 23/18, 3/14
U.S. Cl. 177—116                                    17 Claims

ABSTRACT OF THE DISCLOSURE

A weighing scale including an elongated scale beam having a weighing pan at one end and a preload weight at the other end is provided with upper and lower limit stops for the scale beam which are adjustable together so that the weight represented by the energy sensing means of the scale can be varied to a fine degree. The energy sensing means is also mounted for adjustable movement with the stop means so that the momentum of the scale pan at the actuation point is the same in each adjusted position. The platform upon which the stop means and energy sensing means are preferably mounted also serves to stabilize the support tower for the scale beam and said platform is moved by a cam acting against an inclined ramp. The energy sensing means is preferably in the form of a photoelectric cell and an additional photoelectric cell is provided to look across the entrance to the weighing hopper on the scale pan in order to modify said actuation point to anticipate making weight by said scale.

---

The present invention relates generally to the art of weighing scales and, more particularly, to a weighing scale adapted for high speed batch weighing to automatically control the operation of an interconnected apparatus, such as a packaging machine.

During modern packaging operations, such as are performed by the form-and-fill type packaging machines, there exists a necessary requirement that successive batches of the product being packaged must be rapidly and accurately weighed by a scale that is mounted in proximity to the vibratory feed conveyors on the frame of the packaging machine. One problem that arises from this arrangement which has heretofore escaped satisfactory solution is the problem of vibration being transferred from the packaging machine to the weighing scale, which vibration not only affects the accuracy of the weighing operation when ordinary beam scales are used, but has also been found by experience to greatly reduce the useful life of the weighing scale. Further, the technology of the packaging machine itself has advanced to the point that when a conventional beam type scale must be used to perform the weighing operation, the increased speed of the machine can not be realized due to the inherent slowness of response of the scale. An additional problem that is encountered in some cases is the fact that the atmosphere in which the scale is used is contaminated with a substantial amount of foreign matter, for example from the product being packaged, and this foreign matter inevitably finds its way into the operative structure of the scale thus affecting the accuracy of the weighing operation and the life of the scale. In the past, many attempts have been made to modify existing weighing scale structures to fit these particular requirements, however, each has proven to be lacking in one or more significant respects.

Accordingly, it is one object of the present invention to provide a weighing scale which is constructed so as to overcome the foregoing shortcomings of the prior art.

It is another object of the present invention to provide a weighing scale of the type described having a simplified scale means construction which has fast response and is generally unaffected by machine vibration and atmospheric conditions.

The preferred embodiment of the weighing scale shown to illustrate the principles of the present invention is constructed with a single elongated scale beam which is supported for weighing movement on a single supporting tower by a plurality of cross flexure members. A portion of the scale beam forms a simple parallelogram structure with the supporting tower, a support member for the scale pan and a lower spacer member, which elements are all connected by flexure members thereby giving a stiff movement to the scale and a fast response during each weighing cycle. It will also be realized that this parallelogram structure forms the complete movable portion of the scale and is ruggedly constructed so as to be self-stabilizing, and thus less susceptible to machine vibration. Further, since there are no loose knife edge pivot points or the like as in conventional beam scales, this movement is generally not subject to jamming and accelerated wear due to vibration or contaminated atmospheric conditions, as in the prior art beam scales. With respect to the possibility of adverse effect by the atmosphere, this is further minimized in this invention by providing a virtually dust tight cover that completely encloses the operating portions of the scale and thus prevents the build up of any significant amounts of foreign matter.

The firing point of the scale, that is the point at which the weight on the scale pan represents a selected predetermined weight and in response to which, for example, the feed into the weighing hopper of the packaging machine is to be terminated, is determined in the preferred embodiment of the invention by interruption of a light beam directed toward a photoelectric cell. This manner of determining the point at which the desired weight is reached is particularly adapted to a control for a packaging machine since the electric signal generated can be used to directly initiate the performance of the necessary function indicated above of closing the discharge gate of the conveyor feeding the hopper at the precise time when the desired amount of product is present in the hopper. For the purpose of adjusting or modifying this critical firing point of the photoelectric cell, the present invention contemplates the use of both rough and fine adjustment means operative to accurately modify the effective length of the lever arm supporting the preload means or counterweight of the balance beam. In this manner, the flag means is capable of being made to interrupt the light beam to the photoelectric cell at any selected preset weight since the effective lever arm of the scale pan remains the same.

In accordance with the present invention, additional modifying means for the firing point of the main photoelectric cell is provided by connecting an additional photoelectric cell in series with said main photoelectric cell in the control circuit. This additional photoelectric cell serves to interpose a modifying current reduction on the main photoelectric cell in response to the detection of product in flight to the scale sufficient to make the preset weight. Thus, the firing point of the main photoelectric cell is anticipated and the signal is generated in the control circuit indicating that weight has been made. As will become apparent, this allows the discharge gate of the conveyor to close immediately upon detecting the product in flight whereby flow to the weighing hopper is immediately terminated giving a more accurate weighing of the batch; it being realized that this prevents a significant number of costly overweights in the packages by a cleaner cutoff of the product feed.

According to another significant feature of the present invention, the above mentioned modification of the effective lever arm of the preload means for the fine adjustment is accomplished by having a limit stop means for the balance beam mounted for cam operated adjusting travel. The photoelectric cell is desirably mounted for movement with the stop means, so that the position of the sensing aperture of said photoelectric cell is fixed with regard to said flag means in any adjusted position. This results in the distance of the pretravel of the scale pan being the same regardless of the adjusted position of the photoelectric cell that determines the weight setting and thus gives a degree of accuracy in this type of adjustable scale which has heretofore not been possible. This is so because the scale parts are subject to the same amount of momentum and inertia during the weighing movement in each adjusted position, and thus once the balance point of the scale is approached and the scale pan begins its downward movement, the sensing aperture of the photoelectric cell is traversed in a uniform manner, thus generating identical control signals over the full range of weights. Furthermore, the length of travel during the weighing movement may be advantageously maintained at a minimum while still insuring that in any adjusted position the sensing aperture is always within the range of travel of the actuating flag.

Another important aspect of the apparatus of the present invention is concerned with the use of a substantially wide movable platform pivoted to the beam supporting tower for mounting the photoelectric cell and the limit stop means for the above mentioned weight adjustment. This specific arrangement has been found to add considerably to the stability of the simplified scale parallelogram structure thus reducing the effect of machine vibration. In other words, according to the present invention, the adjustable platform is utilized for the secondary purpose of reinforcing the supporting tower against lateral deflection that might otherwise be caused by vibration. This result is most advantageously gained by providing a constant and snug engagement between the adjusting cam means and said platform by means of a stiff coil spring which acts against the platform in opposed relationship to said cam.

Accordingly, it is another object of the present invention to provide a weighing scale of the beam type having a simplified parallelogram structure having a stiff movement and a fast response.

It is a further object of the present invention to provide a weighing scale of the type described wherein a photoelectric cell is utilized for accurate determination of successive batch weights.

It is still another object of the present invention to provide a weighing scale of the photoelectric type wherein the firing point of the scale is capable of being adjusted or modified by a simple cam arrangement.

It is still another object of the present invention to provide a photoelectric scale wherein means are provided to anticipate making weight on the scale when sufficient product is detected in flight to the scale.

It is another object of the present invention to provide an adjustable weighing scale of the photoelectric type wherein the sensing aperture of the photoelectric cell is fixed with regard to the limit stop means so that said sensing aperture is traversed in a uniform manner thus generating uniform signals in any adjusted position.

It is still another object of the present invention to provide a weighing scale having simplified self-reinforcing and self-stabilizing structure so as to make the same less susceptible to machine vibration.

It is still a further object of the present invention to provide a weighing scale of the photoelectric type utilizing an improved dashpot damping means for the scale movement, which damping means is capable of mechanical adjustment for the desired degree of effectiveness.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

Figure 1:
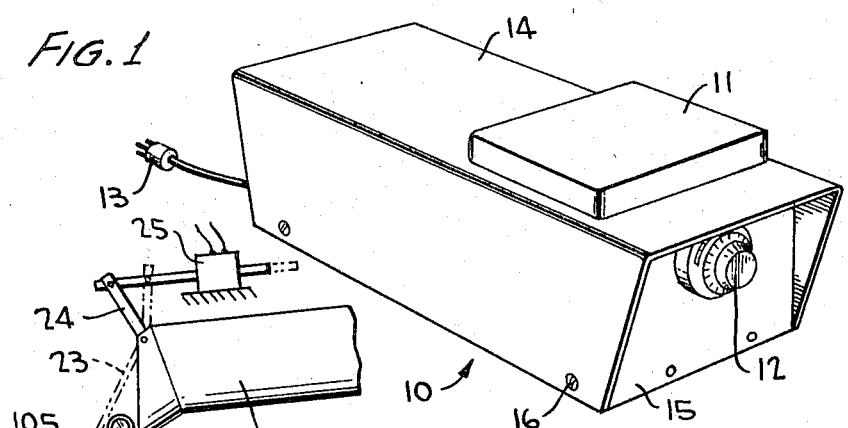
FIGURE 1 is an overall perspective view of a scale constructed in accordance with the teachings of the present invention.

To more specifically explain the preferred embodiment of the invention illustrated, reference is now made to FIGURES 1 and 2 of the drawings wherein is disclosed a scale 10 having an outwardly visible scale pan 11 along the top thereof, a rotary dial 12 that is effective to control the fine weight setting of the scale, as will be seen in detail later, and an electrical input-output cord 13 adapted to be attached to a packaging machine or the like. By viewing FIGURES 1 and 2, it will be realized that scale movement is enclosed by a removable cover 14, which is attached to a base 15 that includes the bottom, front and rear of the scale, by any number of suitable screws 16. This cover 14 forms a dust tight seal with the base 15, as can be noted from these figures, which particularly adapts the scale 10 of the invention to be used in conjunction with a packaging machine (not shown in any of the figures since it forms no part of the present invention). This sealed feature particularly adapts the scale 10 for use in a machine for packaging weighed batches of food products, such as potato chips, wherein it is likely that the surrounding atmosphere is contaminated with foreign matter, such as salt, grease, etc., from the product being packaged.

Figure 2:
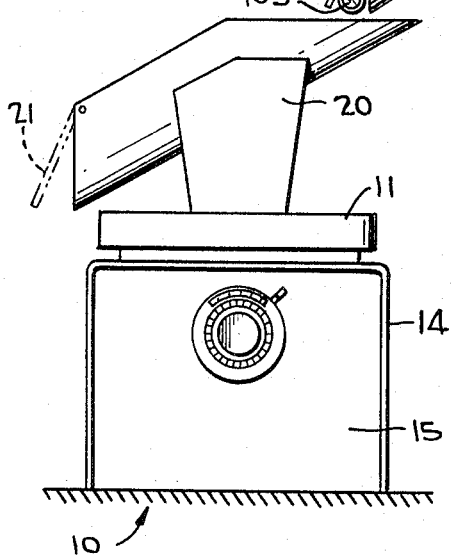
FIGURE 2 is a front view of the scale of FIGURE 1 with an associated hopper and conveyor which can be used with this scale.

As shown in FIGURE 2, the scale pan 11 of the scale 10 is adapted to have a conventional weighing hopper 20 attached thereto for receiving in batches the product to be weighed. As each successive batch is weighed it will be clear to those skilled in the art that the batch can be released by gravity by actuation of a discharge door 21, whereupon the product may proceed down a suitable chute to a preformed package in the packaging machine. Disposed above the hopper 20 is a feed conveyor 22, which is or may be of the vibratory type, and is operative to feed a substantially continuous stream of product into the weighing hopper 20 when a swingable discharge gate 23 is in the open position (note dotted line position of FIGURE 2); the feed being terminated upon closing of the discharge gate 23 in the usual manner. It will be understood that this discharge gate may be actuated by any conventional power unit, as represented by a pivotal lever 24 and an electrically operated two-way solenoid 25, as shown in this figure. While the scale 10 is particularly adapted for use with this type of weighing hopper 20 and conveyor 22 for bulk food products, as will become clearer upon consideration of the remainder of this disclosure, it should be pointed out at this point that other uses to which the scale 10 can be put, that is, where similar performance characteristics are required, will be evident to those skilled in this art and accordingly, this showing of the apparatus should be considered to be merely for the purpose of illustrating certain more restrictive aspects of the present invention.

Figure 3:
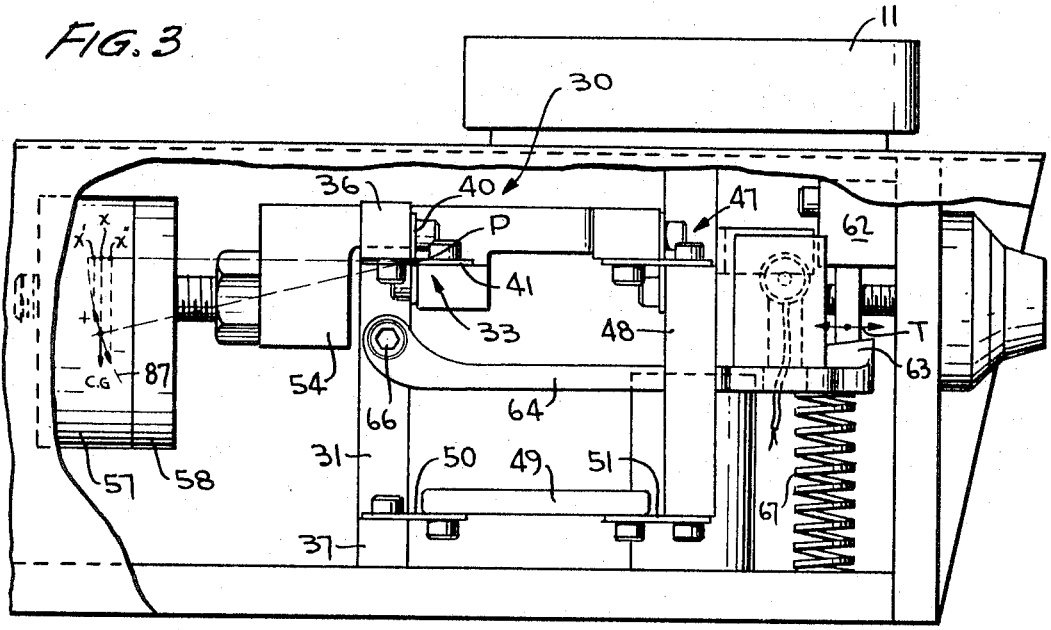
FIGURE 3 is an enlarged side view of the scale of FIGURE 1 with the outside cover cut away to show the balance beam mechanism.
Figure 4:
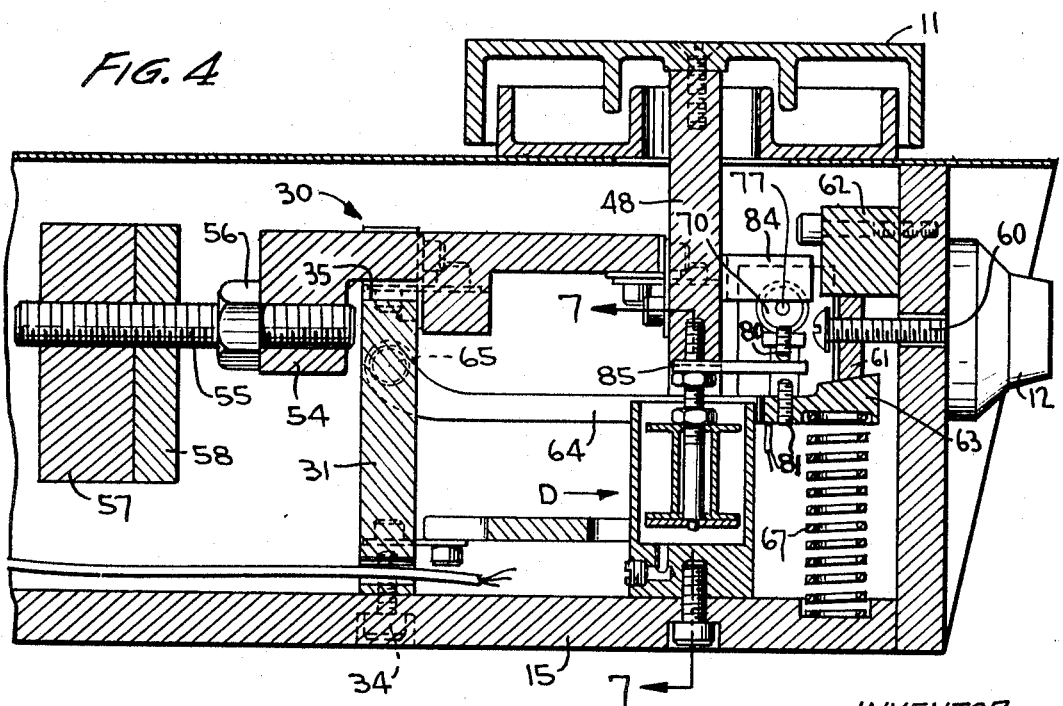
FIGURE 4 is a cross-sectional view taken along the centerline of the scale of FIGURE 1.
Figure 5:
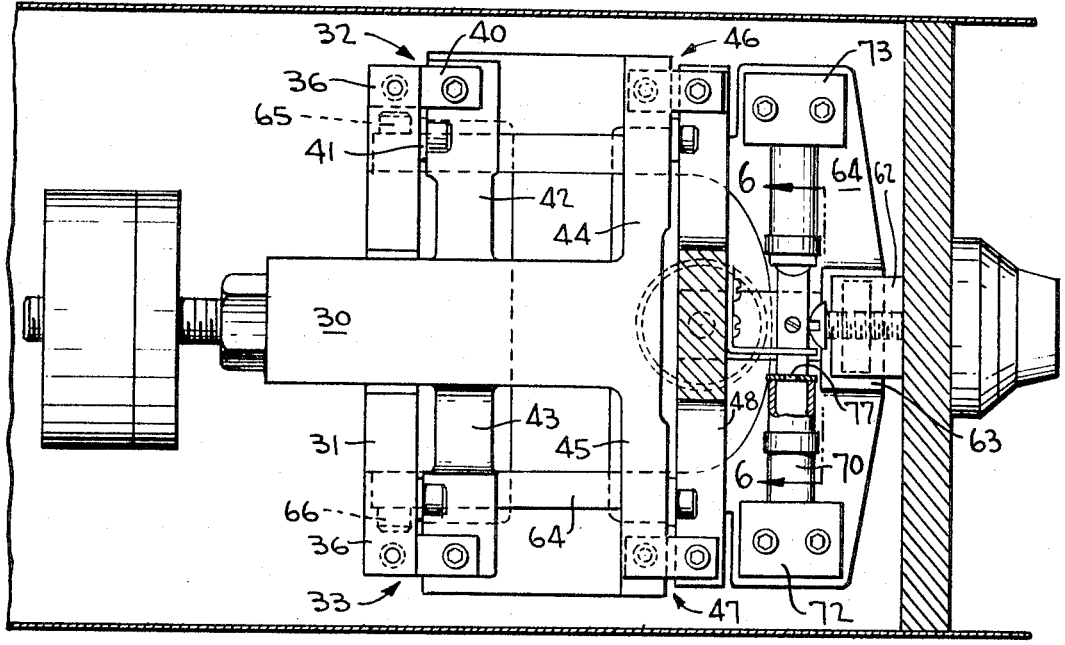
FIGURE 5 is a top plan view of the scale of FIGURE 1 with certain parts cut away.

With reference now collectively to FIGURES 3–5 of the attached drawings, the structure of the scale movement of the preferred embodiment of the invention can be explained. Thus, the scale 10 is provided with an elongated balance beam, generally indicated by reference numeral 30 and supported by a single upstanding supporting tower 31 through a pair of cross flexure units, generally designated by the reference numerals 32, 33 (note FIGURE 5); the juncture of which form a lateral pivot axis P for said balance beam 30 (note FIGURES 3 and 4). As illustrated in FIGURE 4, the supporting tower 31 is suitably fixed to the bottom portion of base 15 of the scale 10 by any form of suitable fasteners 34 which give said supporting tower 31 a rigid foundation mounting. The supporting tower 31 has a recess 35 formed at the top of the same along its centerline to receive the midportion of the balance beam 30 (FIGURE 4) and, as can be seen in FIGURE 3, the sides of the supporting tower 31 have upper and lower projecting support arms 36, 37, respectively. As shown in FIGURE 5, the cross flexure units 32, 33 each comprise a pair of metal flexure plates 40, 41 having one end attached to the support arms 36, 37, and the other end attached to laterally extending portions 42, 43 of the balance beam 30, thus providing the necessary support for the balance beam 30 for pivotal movement about the horizontal pivot axis P.

At the forward end of the balance beam 30 is an additional pair of lateral projections 44, 45 (see FIGURE 5), to the ends of which are attached similar cross flexure units 46, 47, which in turn serve to carry an upstanding support member 48 for the scale pan 11 (FIGURES 3 and 4). The support member 48 is held in parallel relationship at all times to the supporting tower 31 by a lower spacer member 49 having metal flexure plates 50, 51 interconnected to the lower support arms 37 of the tower 31 and the bottom of said support member 48, respectively. In other words, the scale pan 11 is mounted for weighing movement in accordance with the present invention by a parallelogram structure which includes the tower 31, the balance beam 30, the support member 48 and the spacer member 49. Since all of the connecting points of the parallelogram comprise metal flexure plates 40, 41 and 50, 51, the parallelogram movement of the scale 10 is extremely simple and maintenance free and further, because of the inherent stiffness of said metal plates 40, 41 and 50, 51, the scale 10 has been found to be generally insensitive to vibration.

To form the preload means or counterweight for the scale movement, at the remote end of the scale beam 30 is formed an elbow portion 54 threadedly carrying a support rod 55, which is fixed with respect to the balance beam 30 by a locking nut 56. Threadedly mounted on said support rod 55 are a pair of counterweights 57, 58 of diverse weights, and, as will be readily understood, the weights 57, 58 may be rotatably moved along the screw threads of the support rod 55 so as to move the same either closer to or further away from the pivot axis P of the balance beam 30 to either increase or decrease the amount of pre-load being applied to the scale pan 11, respectively. As clearly shown in FIGURE 4, the counterweights 57, 58 are preferably supported along an eccentric axis so that they will always assume the fixed, depending position illustrated in these figures.

The counterweights 57, 58 may be of any selected mass to give the desired preloading effect at the scale pan 11. For example, one turn of the large counterweight 57 may be such as to give a pre-loading effect of ½ ounce, while one turn of the small counterweight 58 may be selected to give a preloading effect of ⅛ ounce; it being understood that because of their eccentric mounting only full turns of the counterweights 57, 58 can be utilized in this adjustment. Thus the counterweights 57, 58 are positioned along the rod 55 in such a manner as to roughly estimate the desired preloading effect of the scale pan 11, and then the final adjustment of the scale 10 is ready to be made through rotation of the dial 12.

As can best be seen in FIGURES 3–5, the rotary dial 12 is secured to the front of the scale that forms a portion of the base 15 of the scale 10, and said dial 12 has secured thereto for rotation therewith a jackscrew 60, which threadedly engages a driver cam 61. Thus, upon turning said dial 12, said driver cam 61 is slidable in a horizontal direction between a guide block 62, disposed above said cam 61, and an inclined ramp 63, that is integrally formed on a pivotally suspended U-shaped platform 64; the legs of said U-shaped platform 64 being pivotally attached to the supporting tower 31 by pivot pins 65, 66 (note FIGURE 5). As best shown in FIGURES 3 and 4, the U-shaped platform is urged in a counterclockwise direction about the pivot pins 65, 66 by a relatively stiff coil spring 67 so that said inclined ramp 63 is constantly biased into snug engagement with said cam 61. It will be realized that as the cam 61 is caused to be horizontally traversed in the direction of the arrow T in FIGURE 3 between the guide block 62 and the inclined ramp 63, there is effected a raising and lowering of the portion of said U-shaped platform 64 adjacent said ramp 63 and opposite the pivot pins 65, 66 for the purpose of adjusting the weight setting of the scale, as will presently be explained.

First, it should be pointed out that since the U-shaped platform 64 is connected to the sides of the supporting tower 31, said platform 64 serves to advantageously stabilize and rigidify said tower 31 against vibration. This is accomplished as a result of the clamping effect of the spring 67 and the cam 61 which is operative to fix the ramp portion of said platform 64 by causing the above mentioned snug engagement of the cam 61 with the inclined ramp 63. This specific construction has been found to add considerably to the stability of the supporting tower 31 so that other supporting structure that might otherwise be required is not needed. Furthermore, it will be noted that the ramp 63 is inclined in a direction away from the supporting tower 31 and the sliding cam 61 has an operative surface that conforms to the incline so that, in effect, there is a constant biasing force transmitted to the supporing tower 31 through said ramp 63 in a direction tending to offset the torsional force on said supporting tower 31 about the pivot axis P created by the counterweights 57, 58 carried by the balance beam 30.

Figure 6:
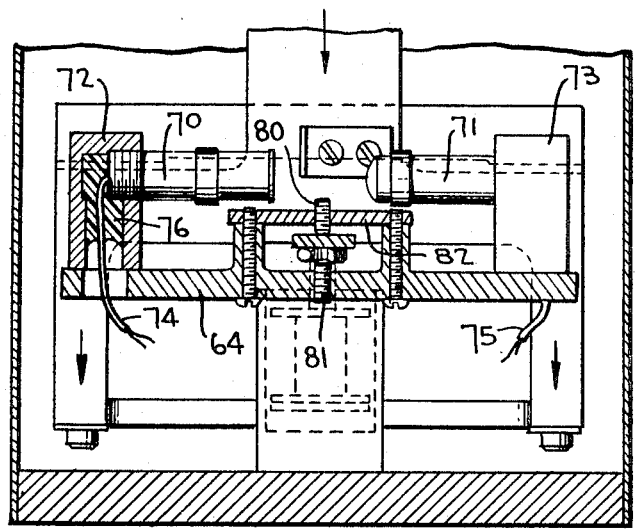
FIGURE 6 is a cross-sectional view taken along line 6—6 of FIGURE 5.

As shown in FIGURES 5 and 6, the portion of the movable platform carrying the ramp 63 supports in preset position a photoelectric cell 70, and an associated light source 71 in opposed relationship thereto so as to cast an operative light beam toward the same. The photoelectric cell 70 and the light source 71 can be mounted in any suitable manner such as by the upstanding mounting blocks 72, 73, respectively, and for convenience they may be made removable by simply unscrewing the elements from their respective mounting block 72, 73. Electrical leads 74, 75 are provided for the photoelectric cell 70 and the light source 71, respectively, and it is noted that suitable packing means 76 is provided in the mounting block 72 to prevent any light from entering the photoelectric cell 70 other than through a sensing aperture 77 formed in the face of said photoelectric cell 70.

The platform 64 also carries means for limiting the weighing movement of the scale pan 11 and through which the balance beam 30 is adjusted about the pivot axis P. This means is best shown in FIGURE 6 of the drawings, and comprises an upper limit stop screw 80 and a lower limit stop screw 81; the upper limit stop screw 80 being threadedly engaged with an auxiliary mounting plate 82 and the lower limit stop screw 81 being threadedly engaged with the body of the movable platform 64, as shown in this figure.

Fixed to the center portion of upstanding support member 48 for the scale pan 11 is a suitable flag 84 which is positioned to interrupt the light beam from the light source 71 to the sensing aperture 77 of the photoelectric cell 70 as the scale pan 11 moves downwardly during the weighing movement. Also carried by the support member 48 and disposed below said flag 84 is an extension member 85 adapted to cooperate with the upper and lower stops 80, 81 to thus limit the weighing movement of the scale pan 11. As can be seen in FIGURE 4, the sensing aperture 77 is in the same vertical plane with the limit stops 80, 81 so that any adjusting movement of the platform 64 by operation of the cam 61 will serve to maintain a fixed relationship between said sensing aperture 77 and the limit stops 80, 81 in the desired manner.

Due to the fact that the counterweights 57, 58 are present on the remote end of the balance beam 30, it tends to be rotated in the counterclockwise direction about the pivot axis P (FIGURE 3) which thereby causes the extension member 85 to be normally held against the upper limit stop 80, as shown in FIGURE 4. In this position, the center of gravity of the combined counterweights 57, 58 is located considerably below the horizontal along an arcuate line 87 as indicated in FIGURE 3, and, as a result, the length of the effective lever arm of the balance beam 30 projected along the horizontal is PX, as indicated. It will be realized that this is an advantageous result of the elbow 54 in the balance beam 30 and the mounting of said counterweights along an eccentric axis on the rod 55, in that a relatively small movement of the balance beam 30 about the pivot axis P causes a substantially linear adjustment of the center of gravity along the line 87, as indicated by the arrows in this figure, and a linear modification of the effective length of the lever arm PX.

Thus, as the cam 61 is adjustably moved by actuation of the rotary dial 12, the platform 64 along with the upper stop 80 is moved through a relatively small increment in a vertical direction, which in turn, changes the weight setting of the scale 10 by repositioning the center of gravity of the counterweights 57, 58 along the line 87, and the effective length of the lever arm PX, as shown and discussed above. For example, if the rotary dial 12 is turned to move the cam 61 to the right (note FIGURE 3) so as to lower the platform 64 and the upper stop 80, the entire parallelogram mechanism supporting the scale pan 11 will be depressed downwardly, thereby resulting in a pivoting of the balance beam 30 about the pivot axis P, which causes the center of gravity of the counterweights to move in the plus direction, as indicated. In turn, this relocation modifies the effective length of the lever arm PX to a new and longer lever arm PX′ resulting in a larger weight being needed on the scale pan 11 to overcome the turning moment about pivot axis P. To the contrary, if the rotary dial 12 is moved to the left (FIGURE 3) causing the spring 67 to raise the platform 64, the center of gravity of the counterweights 57, 58 will move downwardly along the line 87 whereby the effective length of the lever arm PX is reduced to PX″; this, of course, resulting in the desired condition wherein a lesser weight placed on the scale pan 11 will cause an unbalancing of the scale mechanism. As noted above, the photoelectric cell 70 and the light source 71 are mounted for travel along with the stop 80 so that in any adjusted position, the firing point of the photoelectric cell 70 is reached with uniform movement of the flag 84 across the sensing aperture 77, as will be explained in detail later.

Figure 7:
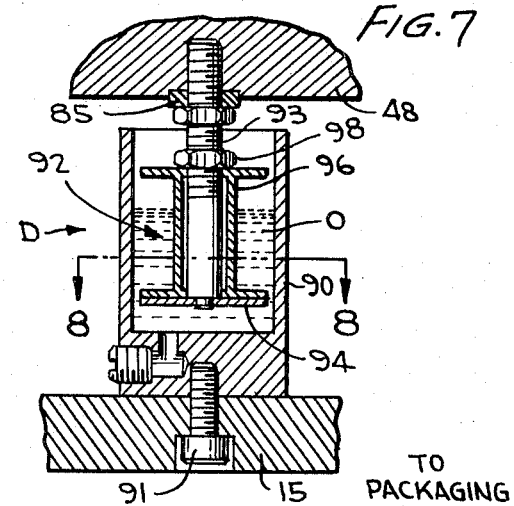
FIGURE 7 is a cross-sectional view taken along line 7—7 of FIGURE 4.
Figure 8:
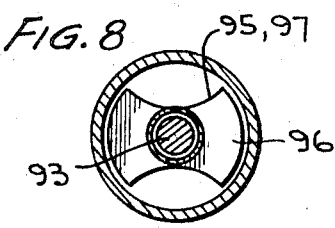
FIGURE 8 is a cross-sectional view taken along line 8—8 of FIGURE 7 showing the open position of the dashpot piston.
Figure 9:
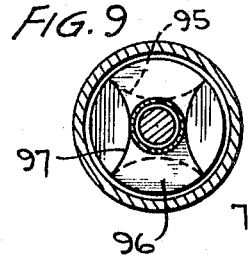
FIGURE 9 is a cross-sectional view identical to that of FIGURE 8 showing the closed position of the dashpot piston.

Attached to the support member 48 directly below the extension 85 is a preferred form of dashpot D, which is particularly adapted for use with the scale 10 of the present invention (note FIGURE 4). As well illustrated in the enlarged view of FIGURE 7, this dashpot D includes a bowl 90 which is securely fastened to the base 15 by a suitable screw 91; the cavity of the bowl 90 being adapted to hold a quantity of damping oil O of suitable viscosity in which an adjustable piston 92 is suspended for movement with the support member 48. The piston 92 is capable of adjustment to vary the effectiveness of the damping of the dashpot which alleviates the problem of having to adjust the movement of the scale by the tedious task of chemically changing the viscosity of the oil O, as in the past. Specifically, the piston 92 comprises a rod 93 to the lower end of which is permanently attached a piston disc 94 having suitable cut out portions 95 (note FIGURES 8 and 9) through which the oil O is adapted to flow from one side of the piston 92 to the other. Journalled for adjustable rotation on the rod 93 and in juxtaposition to the piston disc 94 is a spool-like member 96 having complementary cut out portions 97 (note FIGURES 8 and 9) adapted to be moved into and out of correspondence with the cut out portions 95 of said piston disc 94. A jam nut 98 is provided above the spool 96 whereby the piston 92 can be tightened into an integral structure when the desired damping effect is obtained by relative adjustment of the cut out portions 95, 97 with respect to each other, as will be evident from viewing FIGURES 8 and 9.

In operation of the scale 10 of the present invention, the counterweights 57, 58 are first adjusted to give a rough estimation of the weight to be applied to the scale pan 11. Next, the upper and lower stops 80, 81 are set so that the flag 84 is operative to move across the sensing aperture 77 during the weighing movement of the scale 10. Preferably the upper stop 80 is set so that the bottom of the flag is positioned just at the top edge of the sensing aperture 77, as shown by the full line position of FIGURE 10, and the lower limit stop 81 is set so that the flag 84 completely blocks the light path from the light source 71 at the termination of the weighing movement, as indicated by reference line 99 in FIGURE 10.

Next, the dashpot D is ready to be adjusted to give the proper damping effectiveness during the weighing movement to prevent undesirable "bouncing" of the scale movement during the rapid batch weighing operation. This is accomplished by first loosening the locking nut 98 and then by rotating the spool 96 to align the cut out portions 95, 97 in any relative position to each other between the full open position of FIGURE 8 and the fully closed position of FIGURE 9. As will be evident, if the least amount of damping effect is required, the fully open position of FIGURE 8 would be selected. If, on the other hand, the maximum damping effect is required, the fully closed position of FIGURE 9 would be selected, and for any position in between these two, the proportionate increase or decrease in damping effect is gained. It is noted that these preliminary adjustments of the counterweights 57, 58, the upper and lower limit stops 80, 81 and the dashpot D are usually made at the initial setup of the scale and do not thereafter require adjustment during the use of the scale for any one selected weight setting.

For the final weight setting, the rotary dial 12 is used to reposition the photoelectric cell 70 and the light source 71 along with the upper and lower limit stops 80, 81 thereby setting the firing point of said photoelectric cell 70 to detect the predetermined weight. The rotary dial 12 can, of course, be provided with suitable calibrations to aid in the fine selection of the final weight and, as an example, each revolution of the dial 12 can be made with any number of calibrations to cover one-half ounce per revolution. When the final weight has been set and checked by operating a few cycles of the machine, the dial 12 can be locked in place. If an occasional touch-up of the final weight is found to be required, it is noted that this can be effected with ease by means of said dial 12.

Figure 10:
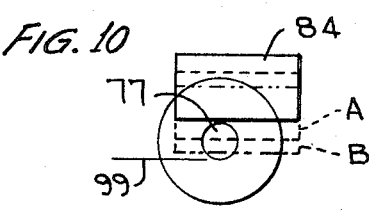
FIGURE 10 is an enlarged view of the photoelectric cell illustrating the relationship of the flag during various stages of interruption of the light beam.

The main result and advantage of the photoelectric cell 70 being mounted for adjustable movement with the limit stop means 80, 81 lies in the fact that the flag 84 desirably moves across the sensing aperture 77 of said photoelectric cell 70 in a uniform manner regardless of the adjusted weight position of said limit stop means 80, 81. Thus, as shown in FIGURE 10, in any adjusted setting of the dial 12 the flag 84 can be considered to move across the sensing aperture 77 to any selected point with the same amount of pretravel, first through a dashed line position designated by the reference numeral A, thence through a dash-dot position indicated by the reference numeral B, and finally to a selected lower limit position indicated by the reference line 99.

The firing point of the photoelectric cell 70 can be selected to occur when the flag 84 is almost at the lower limit of travel or in the position B for example, whereupon the required operation in the associated apparatus is performed. It is emphasized that because the photoelectric cell 70 moves with the limit stop means 80, 81, the firing point (position B) of said photoelectric cell 70 remains the same. Since, as explained above, the amount of pretravel in each adjusted position is identical, the momentum of the scale movement at the firing point does not affect the accuracy of the scale, as in prior art photoelectric devices of this type.

In addition to the fine adjustment for the preselected weight setting accomplished through the dial 12 and just described, the firing point of the photoelectric cell 70 can be further modified or adjusted in accordance with certain aspects of the present invention. This is accomplished by providing an electric control circuit 100 including the photoelectric cell 70 and an additional photoelectric cell 105 in series therewith. This additional photoelectric cell 105 has associated therewith a suitable light source 106, and preferably, has an adjustable rheostat 107 connected in parallel in said control circuit 100 and operative to adjust the equivalent resistance interposed on the main photoelectric cell 70 in said control circuit 100.

The equivalent resistance of the photoelectric cell 105 and the rheostat 107 can be selected to be a relatively small proportion of the total resistance in the control circuit at output lines 110, 111 of said circuit 100. For example, the rheostat 107 can be adjusted so that this equivalent resistance represents a weight setting of the scale 10 of, for example, 1/16 ounce, and it is then evident that this is the amount that the weight setting of photoelectric cell 70 is anticipated in the event that said photoelectric cell 105 is fired. To explain in another way, by viewing FIGURE 10, if the flag 84 reaches the intermediate position A due to the weight of product in the weighing hopper 20 (FIGURE 1) but stops short of the firing position B, then if the firing point of the photoelectric cell 105 is reached, this additional resistance, representing the equivalent of that weight between positions A and B of the photoelectric cell 70, is interposed on the control circuit 100 thus generating the appropriate current signal to the associated apparatus through the lines 110, 111.

Figure 11:
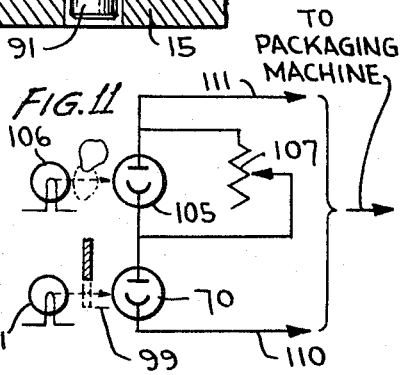
FIGURE 11 is a schematic diagram of a portion of a control circuit for use with the scale.

This additional photoelectric cell 105 is most advantageously positioned at the discharge mouth of the vibratory conveyor 22, as shown in FIGURE 2, in which position it is operative to detect a product in flight to the scale hopper 20 sufficient to make the preset weight and thus to anticipate the firing point of the main photoelectric cell 70. Accordingly, with the operating solenoid 25 of the discharge gate 23 of the vibratory conveyor 22 interconnected to the control circuit 100 through the lines 110, 111, the discharge gate 23 can be closed with a cleaner cutoff during each filling and weighing cycle regardless of the relative feed rate thereby rendering the scale 10 more accurate. That is, the scale 10 and associated control circuit 100 is designed to operate so as to produce a control signal in the lines 110, 111, either in response to the movement of the flag 84 to the position B across the sensing aperture 77 of the photoelectric cell 70 indicating the total preset weight being made in the weighing hopper 20, or in the alternative, in response to the movement of the flag 84 to position A and a product being in flight toward the hopper 20 between the photoelectric cell 105 and the light source 106 (note dotted line position of product in FIGURE 11) of sufficient weight to make up the difference. The control signal produced in the lines 110, 111 preferably takes the form of a predetermined reduction in current flowing in the circuit 100 due to the increased resistance of the darkened photoelectric cells 70, 105. Of course, this current signal can be amplified, if necessary, to properly operate the solenoid 25 to close the gate 23 in the rapid fashion required for the desired clean cutoff of product feed.

Summarily, certain advantages of the present invention should be evident in that a simplified scale mechanism has been particularly designed to meet the exacting requirements of rapid batch weighing in such a way as to give the unusually accurate and efficient weighing scale 10. Further, it is clear that the scale 10 of the invention can be easily adjusted even during operation of said scale 10 through a novel means wherein the upper and lower limit stops 80, 81 are mounted for adjusting movement and, as a result, the scale movement including the flag 84 that actuates the photoelectric cell 70 can be adjusted with respect to the counterweights 57, 58 to lengthen or shorten their effective lever arms PX whereby the weight represented by the firing of the photoelectric cell 70 can be varied. Furthermore, the inventive scale 10 has been constructed to eliminate inaccuracies due to differences in pretravel of the flag 84 with respect to the photoelectric cell 70 by mounting the same for adjusting movement along with the stops 80, 81, and the susceptibility of scale 10 to vibration has been reduced to a minimum through construction of the scale mechanism so as to be self-stabilizing and self-reinforcing.

In this disclosure, there is shown and described only the preferred embodiment of the invention, but, as aforementioned, it is to be understood that the invention is capable of various changes or modifications within the scope of the inventive concept.

I claim:

1. A weighing scale for high speed batch weighing comprising a scale pan, an elongated scale beam, means for supporting said beam, means for mounting said pan at one end of said beam for weighing movement with said beam, preload means fixed at the other end of said beam, upper and lower limit stop means for limiting said weighing movement, energy sensing means, a source of energy producing a definable column of energy directed toward said energy sensing means, flag means connected to said scale pan for operation on said column for actuating said energy sensing means in response to said weighing movement, and means for adjusting said upper and lower limit stop means together and thereby to adjust said beam whereby the weight represented by the actuation point of said energy sensing means can be varied to a fine degree.

2. The combination of claim 1 wherein is provided means for mounting said energy sensing means and said stop means for concurrent adjustable movement in response to said adjusting means whereby the position of the actuation point of the energy sensing means is fixed with regard to said stop means so that the distance of pretravel and the momentum of said scale pan at the actuation point is the same in each adjusted position.

3. The combination of claim 1 wherein said energy sensing means comprises a photoelectric cell and said source of energy comprises a light.

4. The combination of claim 1 wherein the center of gravity of said preload means includes a counterweight adjustably carried by said other end of said beam, said counterweight being positioned offset from the plane of the centerline of said one end of said beam whereby said effective length of the beam and thus said weight can be increased and decreased in response to opposite movements of said adjusting means in any adjusted position.

5. The combination of claim 1 wherein said scale beam supporting means includes a tower positioned at a midpoint along said beam and cross flexure members supporting said beam on said tower and said adjusting means includes sliding cam means operatively connected to said stop means.

6. The combination of claim 5 wherein is provided a movable platform pivotally attached to said tower for mounting said energy sensing means and said stop means, said adjusting means acting against a portion of said platform remote from said tower to vary the position of said energy sensing means and said stop means and spring means to constantly bias said portion of said platform into snug engagement with said adjusting means to maintain said energy sensing means in a preset position and to stabilize said tower against vibration through said platform.

7. The combination of claim 5 wherein is provided a movable platform pivotally attached to said tower for mounting said energy sensing means and said stop means, an inclined ramp on said platform remote from said tower, spring means to constantly bias said ramp into snug engagement with said cam means to maintain said energy sensing means and said stop means in a preset position and to stabilize said tower against vibration through said platform, said cam means comprising a fixed guide block, a driver cam interposed between said guide block and said inclined ramp and means for moving said driver cam along said ramp to effect the adjustment of the actuation point of said energy sensing means.

8. The combination of claim 5 wherein said preload means is in the form of a counterweight carried for adjustable movement along said beam, whereby to provide for a rough adjustment of said scale in addition to the fine adjustment afforded by said cam means.

9. The combination of claim 5 wherein said scale pan mounting means includes a support member extending parallel to said tower, cross flexure members for connecting said support member to said one end of said beam, a lower spacer member flexibility interconnecting the base of said tower and the bottom of said support member whereby the said tower, beam, support member and spacer member form a parallelogram.

10. The combination of claim 9 wherein is further provided a dashpot containing fluid for damping the movement of said parallelogram and scale pan, said dashpot comprising a piston having cutout portions to allow said fluid to flow around said piston, a rod connecting said piston to said scale pan support member, a spool member journalled on said rod having one end positioned in juxtaposition to said piston, said on end having complementary portions for adjustment with respect to said cutout portions to block the flow of said fluid therethrough and clamping means to clamp said spool against said piston in an adjusted position of said cut out and complementary portions to thereby vary the damping action on said parallelogram.

11. The combination of claim 7 wherein said driver cam has an inclined operative surface mating with said inclined ramp, said ramp being inclined in the direction away from said other end of said beam, whereby the torsional effect of said pre-load means on said tower is offset by said cam means.

12. The combination of claim 7 wherein said means for moving said driver cam includes a jackscrew extending between said ramp and said guide block and threadedly engaging said cam, and a rotary dial fixed to the end of said jackscrew whereby rotation of said jackscrew effects movement of said driver cam along said ramp.

13. In a weighing scale for high speed batch weighing wherein a conveyor having an operative discharge gate feeds a predetermined amount of product to a hopper carried by the scale pan of said scale, the improvement comprising an electric circuit, a first photoelectric cell in said circuit, a first source of light producing a light beam directed toward said first photoelectric cell, flag means connected to said scale pan for operation on said light beam from said first source for firing of said photoelectric cell in response to the weighing movement of said scale pan, a motor in said circuit responsive to the firing of said photoelectric cell to close said gate, a second photoelectric cell in said circuit connected in series with said first photoelectric cell, a second source of light producing a light beam directed toward said second photoelectric cell, said second photoelectric cell being positioned to look across the outlet of said conveyor adjacent said gate for operation on said light beam from said second source to determine the presense of product ready to enter said hopper, said second photoelectric cell serving to anticipate making weight in said hopper by modifying the firing point of said first photoelectric cell, whereby said motor is actuated to immediately close said discharge gate so that accurate batch weight is gained.

14. The combination of claim 13 wherein is provided an adjusting means in said circuit including a variable resistor connected in parallel with said second photoelectric cell to control the degree of anticipation interposed on the firing point of said first photoelectric cell.

15. A weighing scale for high speed batch weighing comprising a scale pan, flag means connected to said scale pan, an elongated scale beam for supporting said scale pan for weighing movement, preload means connected to said scale beam for determining said weighing movement, an electric circuit, a first photoelectric cell in said circuit, a first source of light producing a light beam directed toward said first photoelectric cell, said flag means serving to operate on said light beam from said first source for firing said first photoelectric cell in response to said weighing movement, means for modifying the firing point of said first photoelectric cell to gain accurate batch weight on said scale pan, said modifying means comprising means to adjust the relative position of said flag means with respect to said preload means whereby the weight represented by the firing point of said first photoelectric cell can be varied, said modifying means further comprising a second photoelectric cell in said circuit, a second source of light producing a light beam directed toward said second photoelectric cell, said second photoelectric cell being connected in series with said first photoelectric cell for operation on said light beam from said second source to anticipate making weight on said scale pan by detecting product in flight toward said scale pan.

16. The combination of claim 15 wherein is further provided an adjusting means in said circuit including a variable resistor connected in parallel with said second photoelectric cell to control the degree of anticipation interposed on the firing point of said first photoelectric cell.

17. A weighing scale for high speed batch weighing comprising a scale pan, flag means connected to said scale pan, means for supporting said scale pan for weighing movement, preload means connected to said scale pan for determining said weighing movement, stop means for limiting said weighing movement, an energy sensing device, a source of energy in opposed relationship to said energy sensing device providing a path of energy to the same, said flag means being connected to said scale pan for operative movement with respect to the path of said energy in response to said weighing movement, and means for adjusting the relative position of said flag means with respect to said preload means whereby the weight represented by the firing point of said energy sensing device can be varied, said adjusting means comprising a platform connected to said stop means and said energy sensing device to move the same together whereby the distance of pretravel and the momentum of said scale pan at the firing point of said energy sensing device is the same in each adjusted position.

References Cited
UNITED STATES PATENTS

| | | |
|---|---|---|
| 2,645,447 | 7/1953 | Clark et al. _____ 177—54 X |
| 2,939,694 | 6/1960 | Bradley _____ 177—210 |
| 3,148,742 | 9/1964 | Giulie. |
| Re. 26,100 | 10/1966 | Cahn _____ 177—210 |

RICHARD B. WILKINSON, *Primary Examiner.*

GEO. H. MILLER, JR., *Assistant Examiner.*

U.S. Cl. X.R.

177—60, 187, 210; 250—231